Jan. 3, 1961          D. BERLIN          2,967,060
SQUARE SHOPPING CART
Filed Oct. 15, 1956          2 Sheets-Sheet 2
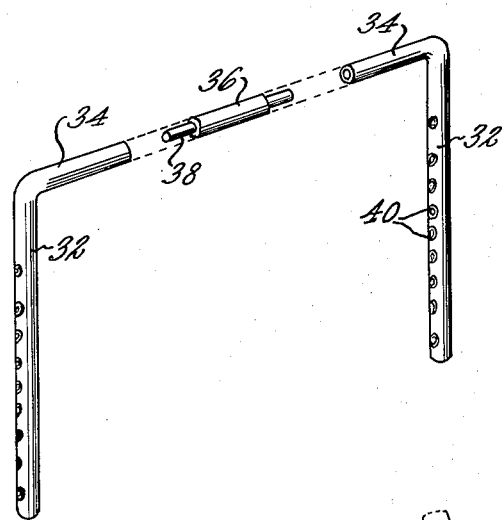
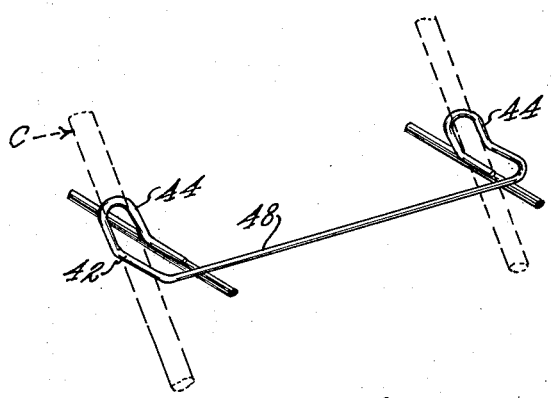
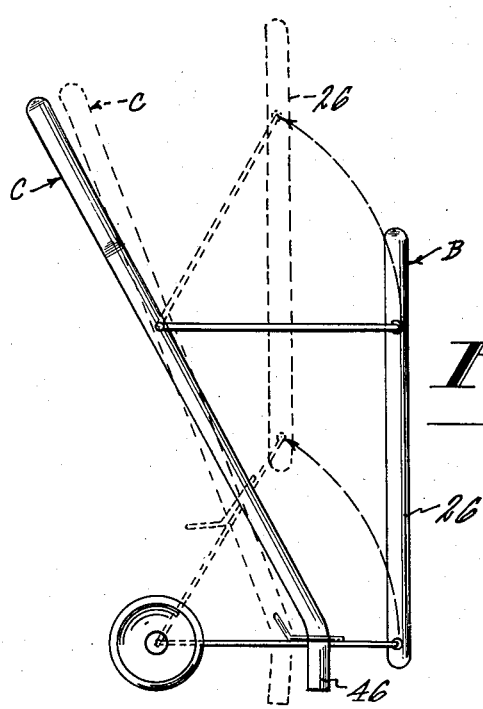
INVENTOR.
DANIEL BERLIN
BY
ATTORNEY United States Patent Office 2,967,060
Patented Jan. 3, 1961

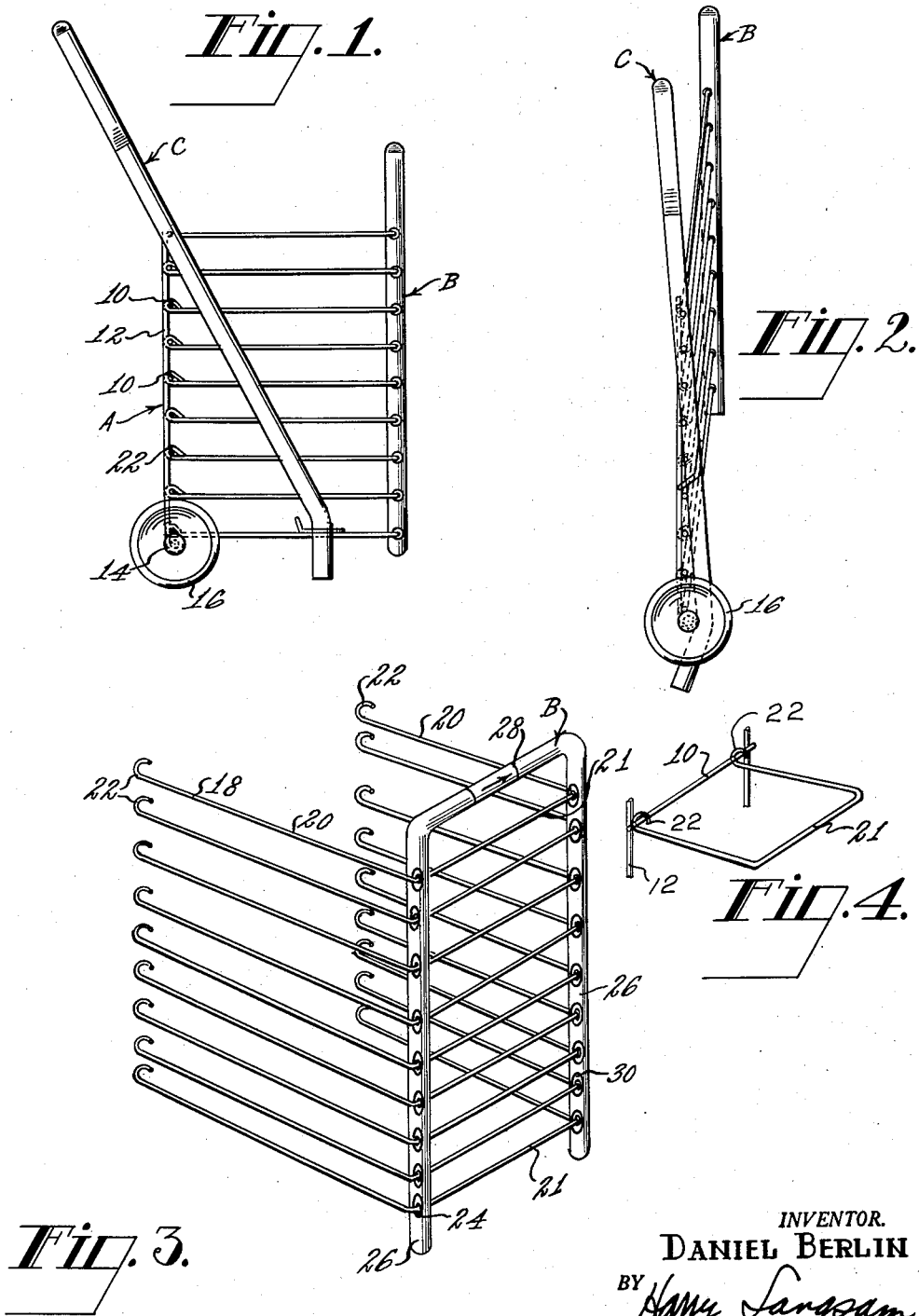

2,967,060

SQUARE SHOPPING CART

Daniel Berlin, 4424 Paul St., Philadelphia, Pa.

Filed Oct. 15, 1956, Ser. No. 616,082

3 Claims. (Cl. 280—36)

My invention relates to a collapsible cart and more particularly relates to a collapsible shopping cart commonly used to receive, store and transport articles or parcels during marketing or similar activities.

In the present day mode of living, with small apartments or houses in which storage space is at a premium, it has become increasingly necessary to use compact, convertible and collapsible devices, whereby one device may do the work of several. Furthermore, when such a device is not in use at all, it is desirable for it to have the capacity to be collapsed or folded into a small compact unit which will occupy but a small storage space. With the advent of suburban living and widely separated shopping centers, it is the custom for the shopper to bring along a shopping cart which may conveniently be carried in an automobile to the market center. These shopping carts must of necessity be sturdy in construction and of large capacity in order to accommodate a considerable volume of parcels which are purchased in the various stores within the center and transported therebetween during the shopping tour.

While numerous carts of this nature have been previously manufactured, such carts have been found to be wanting because their complicity of structure which makes manufacture expensive or because of their intricate folding construction presenting problems to the user.

Although it is primarily for shopping use that the present invention has been designed, the device may just as well be used for many other purposes in its original state, and may easily be converted to serve further uses when desired.

It is, therefore, an object of my invention to provide a sturdy shopping cart which may easily be collapsed into a small storage space.

Another object of my invention is to construct a collapsible shopping cart whose arrangement of parts are such as to provide for ease of economical manufacture, requiring a minimum of welded components, and which is adapted for large scale production.

Another object of my invention is to provide a collapsible shopping cart wherein an efficient and simple manner of folding is afforded.

Another object of my invention is to provide a collapsible shopping cart which is useful for many purposes in its original state and which may easily be converted to serve additional purposes.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing, in which:

Fig. 1 is a side view of a collapsible shopping cart embodying my invention, the cart being in open position.

Fig. 2 is a side view of the collapsible shopping cart in folded position.

Fig. 3 is a perspective view of the side wall construction prior to assembly upon the shopping cart frame.

Fig. 4 is a perspective view of a strut used in the side wall construction.

Fig. 5 is a fragmentary exploded view of the handle construction.

Fig. 6 is a side view of the cart showing the position of its elements during the folding operation.

Fig. 7 is a fragmentary perspective view of the lower portion of the cart showing the manner in which the frame slidably engages with a slip loop.

Referring now in greater detail to the drawings, I show a collapsible cart comprising a rear reticulated section, generally designated as A, a folding forward section, generally designated as B, and a frame, generally designated as C.

The rear reticulated section A, comprises a plurality of horizontal wire struts 10, which are secured to a pair of vertically extending wire posts 12. To provide additional support and to add further lattice structure for retaining the articles within the cart, a plurality of vertical struts (not shown) are affixed to the horizontal struts. In this regard the rear section A as well as the bottom of the forward folding section B, are generally formed by intersecting rodlike members of similar diameter in spaced relationship with each other. These rodlike members may be wire or tubing suitably joined as by welding, soldering or riveting to form a reticulated or lattice-like structure. An axle 14 extends transversely across the lower portion of the rear reticulated section A intermediate the vertical posts 12 and protrudes slidably beyond the edges thereof. Ground engaging wheels 16 are suitably mounted upon the axle 14 and provide means for rolling the cart about.

The folding forward section B is generally U-shaped in horizontal section when in open position and comprises a plurality of wire ribs 18 which are maintained in parallel spaced relationship with each other. Each wire rib 18 is integrally formed into a U-shaped construction having spaced parallel arms extending from a closed bight portion 21. The free ends of the arms are bent into an eyelet 22 each of which impresses opposite ends of the corresponding horizontal strut 10 when in assembled position. The vertical separation of the ribs 18 adjoining their bight portion 21 is provided by pivotally securing the ribs within a series of vertically spaced holes 24 which pass through opposite parallel legs 26 of a U-shaped tubular bracket member 28. Thus it is easily seen that the forward section B is free to swing or pivot about the horizontal struts 10 and be collapsed flat against the rear section A. Crimped washers 30 maintain the bracket member 28 secure from sliding about the periphery of the ribs.

The frame C is also generally U-shaped in construction and comprises a pair of tubular support members 32 having inwardly turned elbows 34 which are detachably secured to a central handle portion 36. The handle portion 36 has a reduced tapered portion 38, the latter of which is pressed within the inner diameter of the elbows 34. A series of vertically spaced holes 40 extend through the support members 32 and through which the arms 20 of the ribs 18 pass. These holes 40 permit slidable engagement with the ribs 18 during the folding operation of the forward section B.

A locking bracket 42 is welded to the lowermost rib and affords a limiting action for the cart in fully open position. This bracket 42 has looped ends 44 which encircle the support members 32 of the frame C. In full open position the feet 46 of the frame C are restricted from further slidable movement when the side legs 46 abut against the horizontal transverse member 48 of the leg members 42.

As is easily apparent from the foregoing description, the mode of collapsing the cart is as follows. The central portion of the tubular bracket member 28 is lifted vertically and backward toward the frame C as is shown in Fig. 6. The loops 44 of the locking brace 42 is slidably raised diagonally upward upon the support members 32. The ribs 18 will pivot about each of the horizontal struts 10 and the frame C will slide simultaneously along each of the arms 20 of the ribs until the entire structure will be collapsed into a flat position, shown in Fig. 2.

In order to place the cart in open position, the central portion of the bracket member 28 is urged downwardly and forward of the frame C until the feet 46 of the frame C strike against the closed portion 48 of the locking members 42.

Although my invention has been described in considerable detail, such description is intended as being illustrative rather than limiting, since the invention may be variously embodied, and the scope of the invention is to be determined as claimed.

I claim as my invention:

1. A collapsible shopping cart comprising a plurality of vertically spaced struts, a pair of posts affixed to said struts, a plurality of U-shaped wire ribs respectively pivotally mounted to said struts adjacent the ends thereof, the bight portion of said ribs being pivotally secured in vertically spaced relationship with each other and passing within a tubular U-shaped bracket member, a U-shaped frame having support members pivotally secured to the uppermost strut, a locking bracket affixed to the lowermost rib and slidable on said frame whereby a minimum of welded components are required and said cart may be pivotally collapsed vertically into a substantially plane configuration, and said U-shaped bracket member comprising two inverted L-shaped members and interfitting central portions.

2. The invention of claim 1 wherein the lowermost strut is an axle having ground engaging wheels rotatably supported thereon.

3. The invention of claim 1 wherein said locking bracket includes looped end portions and a horizontal transverse member, said looped end portions encircling said support members whereby in the full open position said support members abut against said horizontal transverse member thereby restricting said support members from slidable movement.

References Cited in the file of this patent
UNITED STATES PATENTS

| | | |
|---|---|---|
| 449,007 | Spain | Mar. 24, 1891 |
| 550,518 | Marquis | Nov. 26, 1895 |
| 1,425,587 | Hammond | Aug. 15, 1922 |
| 2,155,896 | Goldman | Apr. 25, 1939 |
| 2,468,604 | Salat | Apr. 26, 1949 |
| 2,738,984 | Korchan | Mar. 20, 1956 |
| 2,835,500 | Berlin | May 20, 1958 |
| 2,920,900 | Best | Jan. 12, 1960 |

OTHER REFERENCES

Article in "Los Angeles Times," Part 1, page 35 published Sunday, March 4, 1956.